US005925203A

United States Patent [19]

Riddle et al.

[11] Patent Number: 5,925,203

[45] Date of Patent: Jul. 20, 1999

[54] METHOD OF MAKING A PLASMA DISPLAY

[75] Inventors: George Herbert Needham Riddle, Princeton; Ashok Naryan Prabhu, East Windsor; Dennis Lee Matthies, Princeton, all of N.J.; Attiganal Narayanaswamy Sreeram, Lansdale, Pa.

[73] Assignee: Sarnoff Corporation, Princeton, N.J.

[21] Appl. No.: 08/887,943

[22] Filed: Jul. 1, 1997

Related U.S. Application Data

[62] Division of application No. 08/655,328, May 24, 1996, Pat. No. 5,747,931

[60] Provisional application No. 60/010,797, Jan. 30, 1996.

[51] Int. Cl.[6] .......................... B32B 31/26; B32B 31/12; H01J 17/49

[52] U.S. Cl. .................................... 156/89.16; 156/89.11; 156/89.12; 156/89.28; 156/219; 156/246; 156/250; 156/257; 313/581

[58] Field of Search ............................. 156/89.11, 89.12, 156/89.16, 89.28, 219, 220, 246, 257, 268, 250; 264/629, 678; 313/581

[56] References Cited

U.S. PATENT DOCUMENTS

| | | | |
|---|---|---|---|
| 3,755,027 | 8/1973 | Gilsing . | |
| 3,942,061 | 3/1976 | Van Esdonk et al. . | |
| 4,256,533 | 3/1981 | Mayer . | |
| 4,270,823 | 6/1981 | Kuznetzoff . | |
| 4,374,457 | 2/1983 | Wiech, Jr. . | |
| 4,510,417 | 4/1985 | Harvey . | |
| 4,546,065 | 10/1985 | Amendola et al. . | |
| 4,764,139 | 8/1988 | Murata et al. . | |
| 5,164,633 | 11/1992 | Kim et al. | 313/581 |
| 5,240,671 | 8/1993 | Carey . | |
| 5,308,556 | 5/1994 | Bagley . | |
| 5,424,605 | 6/1995 | Lovoi | 313/422 |
| 5,440,201 | 8/1995 | Martin et al. . | |
| 5,565,729 | 10/1996 | Faris et al. . | |
| 5,599,413 | 2/1997 | Nakao et al. . | |
| 5,686,790 | 11/1997 | Curtin et al. | 313/493 |
| 5,714,840 | 2/1998 | Tanabe et al. | 313/581 |
| 5,723,945 | 3/1998 | Schermerhorn | 313/581 |

*Primary Examiner*—Curtis Mayes
*Attorney, Agent, or Firm*—William J. Burke

[57] ABSTRACT

A plasma display includes a front panel having a glass body secured to a surface of a substrate. The glass body has a plurality of channels in the exposed surface thereof with upstanding ribs being between the channels. Conductive first electrodes are on the body with each electrode extending along the bottom of a separate channel. The first electrodes are preferably embedded in the glass body. A transparent front panel is over the back panel and is seated on and secured to the glass body. A plurality of spaced, parallel second electrodes extend between the front panel and the back panel substantially orthogonally to the first electrodes. Phosphors which emit different colors are coated on the channels and the channels are filled with a plasma gas.

The back panel is formed of at least one and preferably a plurality of layers of a green tape of glass particles in a binder. The layers are stacked one on top of each other and the channels are formed in the surface of one of the layers. The stack is placed on a substrate and fired to bond the layers together and to the substrate. Prior to firing the stack, the first electrodes can be formed on one of the layers so that after firing the electrodes are embedded in the resulting glass body. For a body formed from a single layer of the green tape, the channels are formed in the surface of the layer which is opposite to the substrate.

16 Claims, 3 Drawing Sheets

METHOD OF MAKING A PLASMA DISPLAY

This is a division of application Ser. No. 08/655,328, filed May 24 1996 now U.S. Pat. No. 5,747,931 issued May 5, 1998.

This application claims benefit of provisional 60/010,797 filed Jan. 30, 1996.

FIELD OF THE INVENTION

The present invention relates to a plasma display and a method for making such a display. More particularly, the present invention relates to a plasma display having a ceramic barrier between the front and back plates of the display and a method of making the same.

BACKGROUND OF THE INVENTION

Plasma displays operate by selectively exciting an array of glow discharges in a confined rarified noble gas. Full color displays are made by generating a glow discharge in a mixture of gases, such as He-Xe or Ne-Xe gas mixture which generates ultra violet light. The ultra violet light excites phosphors to produce light of the desired color. Such displays have been described in an article by A. Sobel entitled "Plasma Displays" in IEEE TRANSACTIONS ON PLASMA SCIENCE, vol., 19, no. 6, Dec. 8, 1991, pgs. 1032–1047 and in an article by P. S. Friedman, entitled "Are Plasma Display Panels a Low-Cost Technology?", in INFORMATION DISPLAY, October 1995, pgs. 22–28.

As shown in FIG. 1, a typical plasma display panel 10 comprises a rear glass substrate 12 having a plurality of substantially parallel, spaced first electrodes 14 on a surface thereof. A thin layer 15 of a dielectric material, such as a glass, covers the electrodes 14. Barrier layers 16 are on the surface of the glass substrate 12 between the first electrodes 14. The barrier layers 16 project from the surface of the substrate 12 a distance greater than the thickness of the first electrodes 14. Red, green and blue (R-G-B) phosphor layers 18, 20 and 22 respectively overlie alternating first electrodes 14 in the spaces between the barriers 16. A front transparent glass substrate 24 overlies the rear glass substrate 12 and rests on the barrier layers 16 so as to be spaced from the rear glass substrate 12 by the barrier layers 16.

An array of substantially parallel, spaced second electrodes 26 are on the inner surface of the front substrate 24 and extend substantially orthogonal to the first electrodes 14. A layer 28 of a dielectric material, typically glasses, covers the second electrodes 26. A layer 29 of MgO covers the dielectric layer 28. Voltages applied to the electrodes in the proper manner excite, maintain and extinguish a plasma in the gas within the region formed by the barriers at the desired times. Addressing of individual pixels is done using external circuitry at the periphery of the panel. Barrier structures ar typically used to confine the discharge to the pixel addressed, eliminating both electrical and optical cross talk between adjacent pixel elements.

In an AC plasma display, the columns of pixels are separated by the barriers, and the first electrodes are arranged beneath the gaps between the barriers. In a DC plasma display, the barrier structures are typically crossed, providing a box-like structure at each pixel element. In the current state of the art, the barriers are formed by multiple, high-precision silk screening steps which cumulatively provide barriers of the desired height and aspect ratio. The height to width aspect ratio for the barriers is determined by the reproducibility of the screening steps and is typically limited to a value of two or three, thereby limiting the obtainable pixel density. It would be desirable to have an alternative means for forming the barrier structures that involve fewer processing steps and provide higher aspect ratios.

SUMMARY OF THE INVENTION

The present invention is directed to a display which includes a back panel having a body of glass with a surface. A plurality of spaced, parallel channels are in a surface of the body with upstanding ribs being between the channels. A plurality of spaced, parallel first electrodes are on the body with each electrode extending along a separate one of the channels. A front panel extends over the body and is secured to the back panel. A plurality of spaced, parallel second electrodes are between the front panel and the back panel and extend orthogonally to the first electrodes on the body.

The present invention is also directed to a method of making a display including the steps of forming at least one layer of a green tape with the tape being particles of glass dispersed in a binder. Spaced, parallel channels are formed in the surface of one of the layers of green tape with upright ribs being between the channels. The green tape is fired at a temperature at which the glass particles fuse to form a glass body having the channels in one surface thereof.

DETAILED DESCRIPTION

Figure 1:
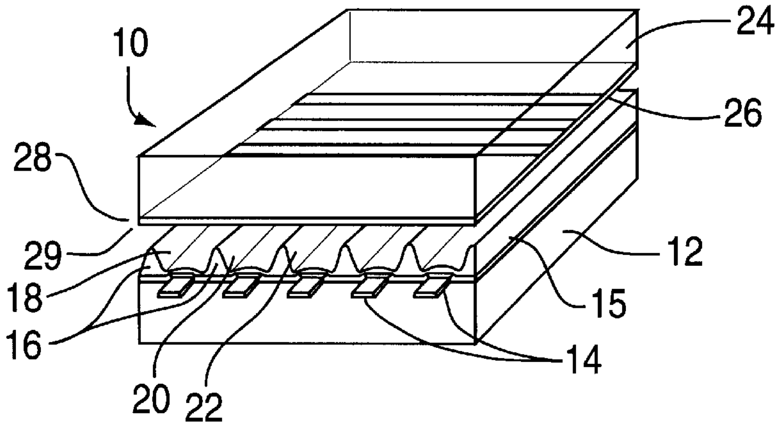
FIG. 1 PRIOR ART
FIG. 1 is a sectional view of a prior art plasma display.
Figure 2:
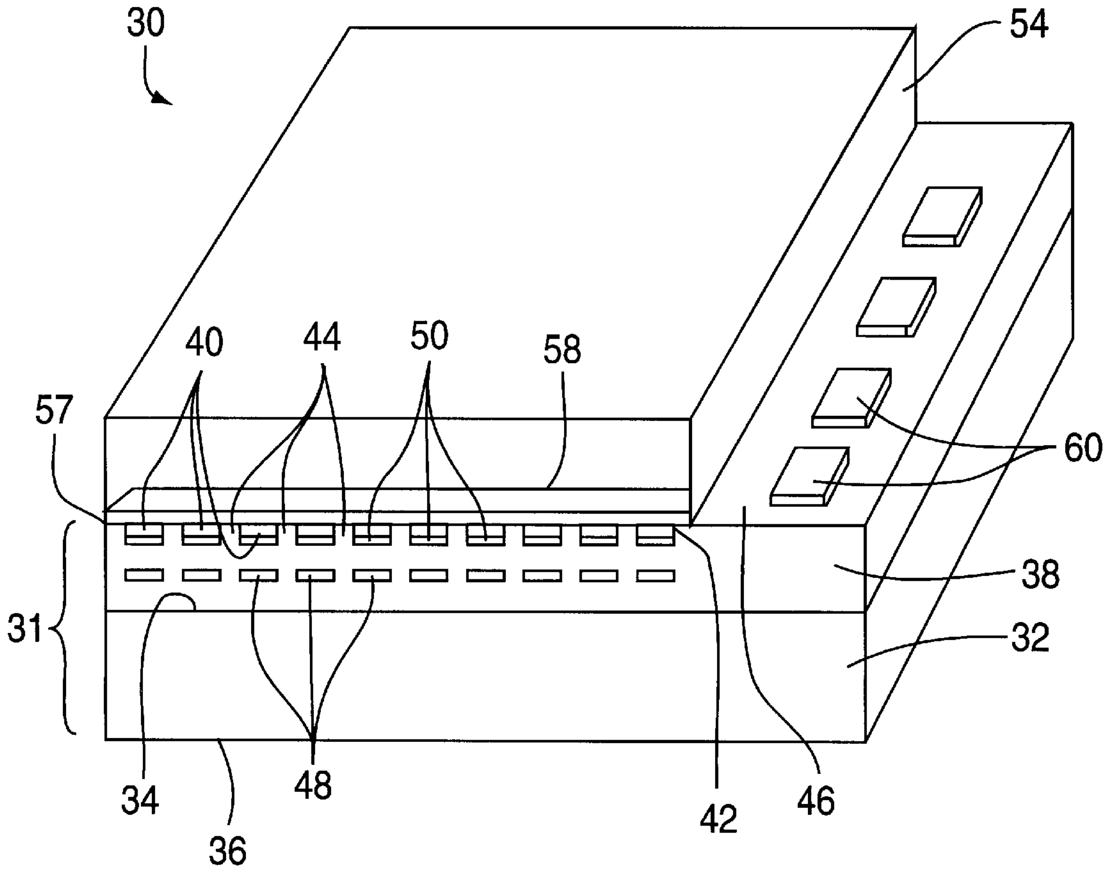
FIG. 2 is a perspective view of a plasma display panel of the present invention.

Referring initially to FIG. 2, a plasma display panel of the present invention is generally designated as 30. Display panel 30 comprises a back panel 31 having a substantially flat substrate 32 of a suitable rigid material, such as a metal, ceramic or glass, having flat opposed surfaces 34 and 36. A substrate 32 of a metal is preferred. On the surface 34 of the substrate 32 is a body 38 of glass. As used herein the term "glass" means a material which is either completely vitrified or at least partially vitrified. The glass body 38 is bonded to the substrate 32 by any suitable bonding material. As will be explained later, the body 38 may be made up of a plurality of layers which are fused together or a single glass layer. The body 38 has a plurality of parallel channels 40 in its upper surface 42 which are spaced apart by upstanding barrier ribs 44. The channels 40 are all of substantially the same width. A surface 46 extends along one side of the body 38.

Spaced apart, parallel first electrodes 48 are embedded within the body 38 and extend under and along the bottom of each of the channels 40. However, if desired the first electrodes 48 may be positioned on and along the bottom surfaces of the channels 40 or on the back surface of the body 38 between the body 38 and the substrate 32. Phosphor layers 50 of red, green and blue emitting phosphor material are coated on surfaces, preferably including the bottom surface, of alternating ones of the channels 40.

Figure 3:
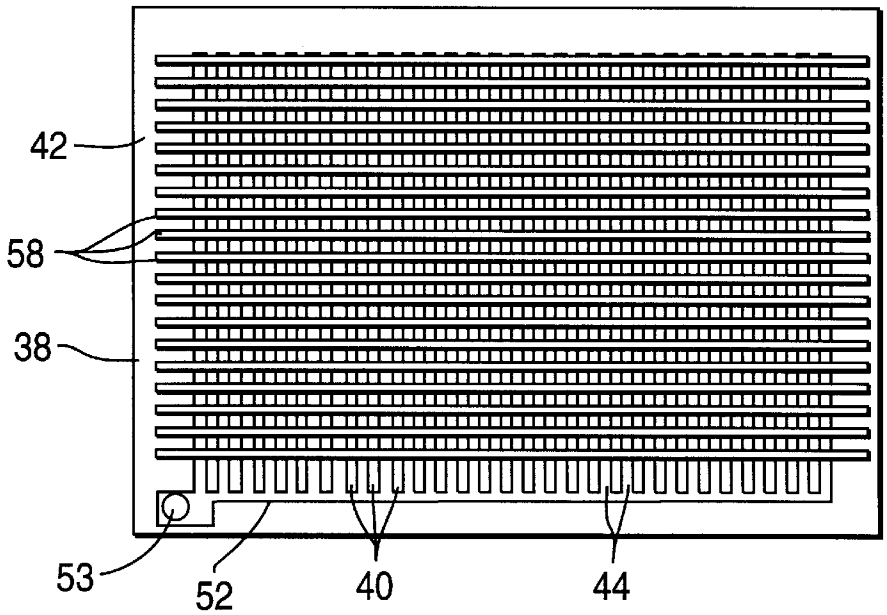
FIG. 3 is a top plan view of the body of the plasma display panel of the present invention.

As shown in FIG. 3, a connecting channel 52 is in the top surface 42 of the body 38 and extends along one end of each of the channels 40. The channel 52 connects all of the channels 40. The channel 52 extends to a hole 53 which extends through the body 38 and the substrate 32 through which the channels can be evacuated and refilled with a plasma gas, as will be explained.

A substantially flat glass front panel 54 extends over the body 38 and is seated on the ribs 44 so as to cover all of the channels 40 and 52, but does not cover the surface 46. The front panel 54 may be secured to the ribs 44 by a suitable bonding material 57, such as a glass frit. Although the front panel 54 must be sealed to the back panel 31 only around the outer edge to retain the discharge gas, it is preferable to bond the front panel 54 to all of the ribs 44. This provides a stronger bond between the front panel 54 and the body 38. One advantage of the stronger bond is that it allows the display to withstand elevated gas pressure within the channels 40. Panels operating at elevated pressure can utilize shorter barriers than panels that operate at low pressure. Shorter barriers can be fabricated with greater ease than tall barriers, particularly when high resolution, requiring a fine barrier pitch, is desired. High pressure discharges also occur more rapidly than low pressure discharges, thereby allowing a higher drive rate and increased light output as desired for bright displays.

On the inner surface 56 of the front panel 54 are a plurality of spaced, parallel, second electrodes 58. The second electrodes 58 extend across the channels 40 orthogonally to the first electrodes 48. The second electrodes 58 may be of a conducting transparent material, such as indium-tin oxide (ITO), or may be of metal films or fine wires. For an AC display, the second electrodes are coated with an insulating material, such as a glass. The electrodes can be connected to external drive electronics by means of connectors, such as flexible ribbon connectors, attached at the periphery of the panel. Preferably, on the surface 46 at the edge of the body 38 are mounted various electrical components 60, such as integrated circuits, capacitors etc., which are connected together to electrical circuits for driving and controlling the plasma display. The first electrodes 48 and the second electrodes 58 are electrically connected to the circuits on the surface 46. However, if desired, the components 60 forming the drive and control circuits may be mounted on the surface 36 of the substrate 32 and connected to the electrodes 48 and 58 either through vias in the substrate 32 and the body 38 or by conductors extending around the edge of the substrate 32 and the body 38. If the components 60 are mounted on the surface 36 of the substrate 32, a layer of an insulating material is provided on the surface 36 to insulated the components 60 from the metal substrate 32.

The display panel 30 is made by first forming the body 38. The body 38 is made by forming a plurality of layers of green tape. Each green tape layer is a mixture of glass particles in a binder of a resin, surfactent and a deglomerating agent in a liquid vehicle. Examples of materials for such green tape layers are disclosed in U.S. patent application Ser. No. 08/467,351, "Method For Producing Laminated, Co-Fired, Ceramic Substrates With Cutouts For Device Placement", now abandoned, U.S. patent application Ser. No. 08/379,266, "Low Loss Dielectric Glasses", now abandoned, U.S. patent application Ser. No. 08/379,264, "Electric Feedthroughs For Ceramic Circuit Board Support Substrates" now U.S Pat. No. 5,565,262, U.S. patent application Ser. No. 08/379,263 (11634), "Glass Bonding Layer For Ceramic Circuit Board Support Substrate" now U.S. Pat. No. 5,581,876, and U.S. patent application Ser. No. 08/379,265 (11664), "Conductive Via Fill Ink For Ceramic Multilayer Circuit Board On Support Substrates " now U.S. Pat. No. 5,514,451. The disclosure of each of these applications in incorporated herein by reference.

Figure 4:
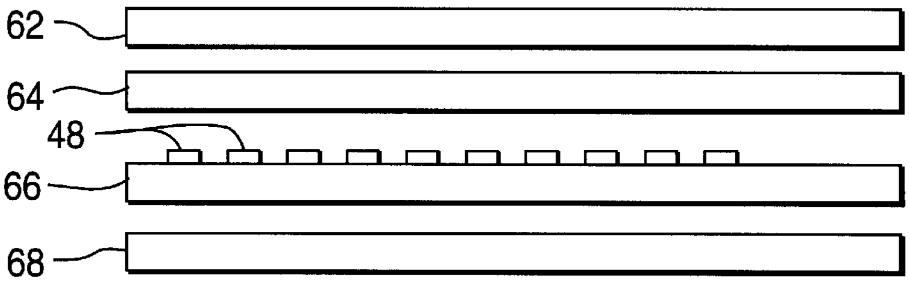
FIG. 4 is an exploded front view of a multilayer structure for forming the body of the plasma display panel of the present invention.

As shown in FIG. 4, a plurality of the green tape layers 62, 64, 66 and 68 are stacked in overlapping relation and placed on the surface 34 of a substrate 32 to form a multilayer back panel structure. However, before stacking the green tape layers 62, 64, 66 and 68, a plurality of conductive strips are formed on the surface of an intermediate green tape layer 66 to form the first electrodes 48. The conductive strips can be formed by suitably depositing the conductive material on the green tape layer 66, such as by silk screening or vacuum evaporation, or by merely placing strips of a conductive foil or wire on the surface of the green tape layer 66. Thus, the first electrodes 48 become a part of the multilayer structure.

Figure 5:
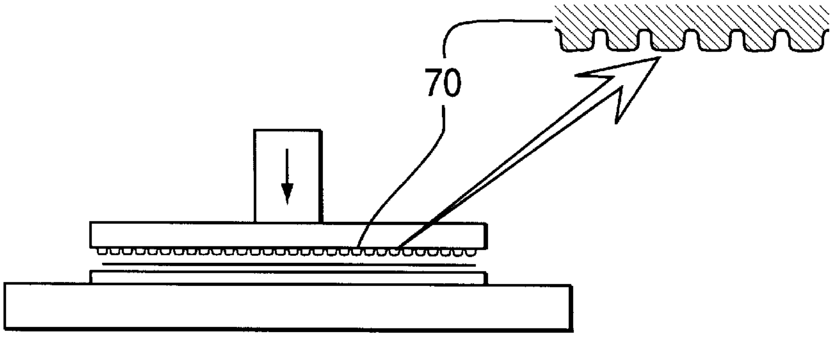
FIG. 5 illustrates one method of embossing plasma barriers into green tape, with a section of the resulting embossed tape.
Figure 6:
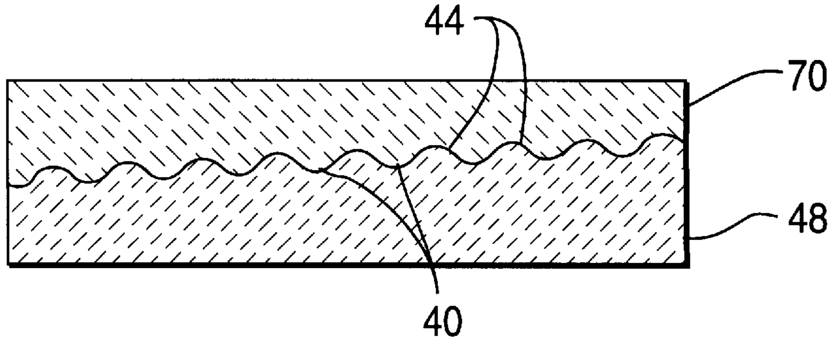
FIG. 6 is a micrograph of embossed barriers formed in a green ceramic tape and fired.

Channels 40 and 52 are then formed in at least the upper green tape layer 62 of the multilayer structure, such as by pressing or embossing. As shown in FIG. 5, one technique for embossing the channels 40 and 52 in the green tape layer 62 is with a die 70 that is formed, e.g. by etching or electroforming a metal plate, so as to contain the inverse of the desired structures. The die 70 is pressed against the green tape layer 62 at a suitable temperature and pressure to emboss the pattern of the channels 40 and 52 and the ribs 44 into the tape surface, as illustrated in FIG. 6. Alternatively to embossing the channels 40 and 52 into the green tape layer 62 after it is made into the multilayer structure, the green tape layer 62 can be embossed with the channels 40 and 52 prior to being stacked with the other green tape layers 64, 66 and 68.

Figure 7:
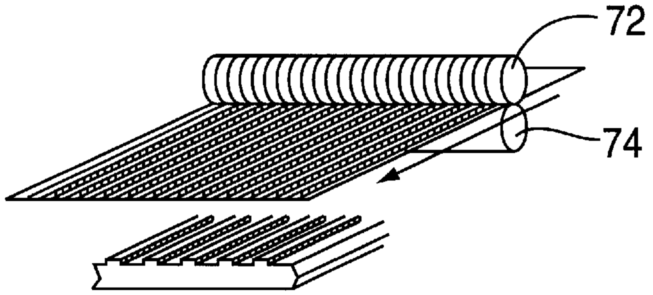
FIG. 7 illustrates another method of embossing barriers into green tape, with a section of the resulting embossed tape.

Referring to FIG. 7, there is shown an alternate technique of embossing the channels 40 and 52 into the green tape layer 62. This technique uses embossing rollers 72 and 74 with the roller 72 having on its surface the inverse of the structure to be embossed. The multilayer structure or a single green tape layer 62 is passed between the rollers 72 and 74 to emboss the channels 40 and 52 and the ribs 44 in the surface thereof.

The channels 40 and 52 can also be formed by cutting or punching out elongated holes through one or more of the green tape layers. When the green tape layers are then stacked to form the multilayer structure there will be provided the channels 40 and 52 and the ribs 44. Since the holes can be cut or punched completely through one or more of the green tape layers, this can provide deeper channels than can be provide by the embossing techniques. In addition, the channels 40 and 52 and ribs 44 can be cast into the green tape layers. Normally the green tape layers are formed by doctor blading the material of the layers onto a sheet of smooth plastic. To cast the channels, the tape is doctor bladed onto a sheet of plastic into which an inverted channel pattern has been molded. When the plastic is peeled away, the channel structure remains in the green tape layer.

The multilayer structure is then fired to a temperature at which the glass in the green tape layers fuses. During the firing of the multilayer structure the liquid vehicle will first evaporate and the resin will serve to bond the glass structure to the substrate. The glass in the green tape layers then fuses together to form a glass body 38 bonded to the substrate 32 with the address electrodes 48 being embedded therein and the channels 40 and 46 and the ribs 44 formed on the surface thereof.

Suitable material systems for the back panel multilayer structure include a copper-molybdenum-copper metal sandwich as the substrate 32 with a MgO-$Al_2O_3$-$SiO_2$ glass with a cordierite filler (900–925° C. firing temperature) body 38; a Kovar metal substrate with a MgO-ZnO-$B_2O_3$ glass with a fosterite and cordierte (825–850° C. firing temperature) body; and a copper-stainless steel-copper metal sandwich substrate with a lead borosilicate glass and an alumina filler (775–800° C. firing temperature) body. Other substrate materials include nickel, copper-nickel-copper and stainless steel.

Thus, the steps needed to form the rear panel of the display panel 30 include the following:

1. Green tape layers are prepared by doctor-blading a slurry of glass and binders. The glass is blended to provide desired characteristics including a thermal expansion coefficient matching that of the front panel. Typical tape thickness is 0.05–0.5 mm.

2. A metal core is cut out to a size larger than the desired active size of the plasma rear panel. This cut out metal core is suitably electroplated, if necessary, with a metal that forms a strongly adhering oxide upon firing. Registration markings are subsequently applied as necessary.

3. The metal core from step 2 is then printed with a glaze that provides a strong bond between the blended glass and the metal core and also minimizes x-y shrinkage during a firing/co-firing operation.

4. Layers of green tape from step 1 are blanked out to size, punched to provide via holes as needed, and with alignment markings, pinholes are punched in for precise registration. Conductors are printed to form electrodes and connections to drive chips to be attached as needed. In order to eliminate x-y shrinkage a layer of inert, non-sinterable material is applied at the very top of the tape stack of the green-tapes. This inert layer can be either in the form of a tape by itself or can be screen printed as an ink on top of the green tape that forms the top layer. The chemical formulation of this inert and nonsinterable material can be alumina, zirconia, boron nitride or any refractory material or any combination of such.

5. The above multiple green tape layers of the glass are stacked along with the inert layer on to a laminating fixture and laminated hot (at temperatures at or above the glass-transition temperature of the resins used as binders in fabricating the green tapes) in a lamination press at a pressure high enough to give a suitable particle packing density in the laminate. The number of tapes to be used is determined in part by the cofired barrier height and the individual green and cofired tape thickness.

6. The laminate from step 5 is embossed to provide the barrier and channel pattern required for the plasma rear panel. This can be accomplished as an additional step or may be combined with step 5.

Embossing is done by using a die which has the inverse of the desired barrier and channel patterns. However, the shape of the inverse barrier in the die can be orthogonal or tapered. The die material can be any metal or metal alloy. If embossing is done as a separate step, it is necessary to use an embossing pressure equal to or higher than the laminating pressure to again achieve desired particle packing density. The embossing pressure and die design is also dependent upon the desired cofired barrier height taking into account the z-shrinkage of the green tape and inert layer. Typical barrier height is 0.05–0.2 mm. A mold release can be applied to the embossing die to eliminate stickiness of the green tape to the die.

7. The embossed stack from step 6 is colaminated to the metal core. This is also done by hot pressing, but at pressures lower than the ones encountered in steps 5 and 6 to prevent distortion of the embossed barriers. With flexible materials and tolling/fixture systems steps 5 through 7 may be combined into one step.

8. The colaminated stack (glass on metal) is then cofired to form a multilayer board. The inert material is removed from the cofired board by simple washing process.

9. Tricolor UV plasma phosphors are deposited in the channels and each color separated by the embossed barriers. The phosphor powder is blended with organic binders and deposited in the channels by screen printing after proper alignment. Alternatively, the phosphor powders suspended in a solvent-resin mixture may be sprayed into the channels through a suitable mask. The multilayer board is then dried in an over and fired to bake out the organic binders in the phosphors.

EXAMPLE

1. Green tape layers were prepared by doctor-blading a slurry of MgO-$Al_2O_3$-$SiO_2$ glass-ceramic system with filler materials and binder system. The inert and non-sinterable top layer was made also in the form of a green tape with $Al_2O_3$ powder and binders. All the tapes were blanked and punched with registration markings.

2. The green tapes were then stacked up and laminated in a hot press at 90° C. and 110 psi to get the desired laminate.

3. Embossing was done at 90° C. using a machined brass die with the inverse of the channel-barrier pattern at 1500 psi. A mold release was brushed onto the embossing die prior to embossing. The mold release formulation consisted of a surfactant-solvent mixture compatible with the binder system of the green tape such that the laminate did not stick to or tear off to the die.

The die was designed to give 0.25 mm wide barriers on a 0.625 mm pitch and 0.1 mm cofired barrier height. Modifications to the embossing technique (mainly lamination and embossing pressure) has also resulted in reproducible fabrication of cofired barrier height of 0.15 mm using the same embossing die.

4. A metal core used was a suitably glazed Cu-Mo-Cu system. Colamination of the embossed stack was done in a hot lamination press at 60 psi and 90° C.

5. After cofiring at 910° C., the alumina layer is washed off ultrasonically and the tricolor phosphors printed in three steps using a separate screen for each color. The phosphor baking process was done at 720° C.

Figure 8:
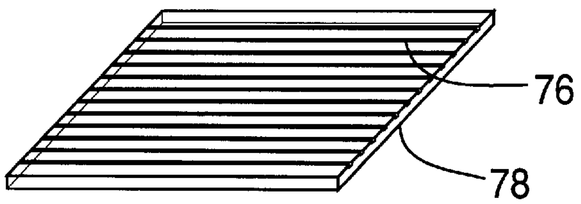
FIG. 8 is a perspective view of a frame on which one set of electrodes are mounted.

The electrical components 60 may then be mounted on the surface 46 and electrically connected together and to the first electrodes to form the desired drive and control circuit. The front panel 54 is then placed over the back panel 31 and seated on the ribs 44. A bonding frit is placed on the ribs 44 so as to bond the front panel 54 to the ribs 44. The front panel 54 is first provided with the second electrodes 58 on its inner surface. The second electrodes can be coated on the inner surface of the front panel 54 by any desired technique, such as silk screening or vacuum evaporation. Alternatively, the second electrodes 58 may be a plurality of spaced, parallel wires stretched across the front panel 54 or the ribs 44. As shown in FIG. 8, spaced, parallel wires 76 are stretched across and strung between two parallel sides of a rectangular frame 78 and secured to the frame 78. The frame 78 can then be placed across the back panel with the wires 76 being seated on the ribs 44. The front panel 54 is then seated on the ribs and sealed thereto. The ends of the wires 76 can then be cut and the frame 78 removed. For an AC display, the wires 76 are coated with an insulating layer, preferably a layer of a glass either before or after being mounted on the frame 78. The ends of the wires 76 can be left bare of glass so that they can be easily electrically connected to the electrical drive circuit. The channels 40 are then evacuated by drawing a vacuum through the hole 53 in the back panel 31 and the connecting channel 52. The channels 40 are then filled with a suitable plasma gas through the hole 53 and the hole 53 is then sealed.

Thus, there is provided by the present invention a plasma display in which a glass body is mounted on a substrate and is provided with an array of channels and ribs on a surface thereof. Address electrodes are formed either within the body or on a surface thereof with the first electrodes extending along the bottom of the channels. Different color emitting phosphors may be provided within the channels. A front panel is mounted over the channels and is seated on and secured to the ribs. Second electrodes are provided between the front panel and the ribs. Electrical components can be mounted on the body and electrically connected together and to the electrodes to provide a drive and control circuit for the panel.

The preferred multilayer structure of the back panel provides a cost effective technology for manufacturing plasma displays. A metal substrate adds substantial strength and resistance to breakage. The process of forming the channels is simpler and less expensive than glass technology. Crossed x-y conductors on the base structure eliminate a need for wiring on the overlying glass. In the multilayer glass structure, signals can be passed along many layers, increasing the range of addressing options.

Although the display of the present invention has been described as a plasma display, it can be of any type of display, such as a vacuum flourescent display, which has similar structure. Also, although the display of the present invention has been described as having a single set of spaced, parallel ribs forming spaced parallel channels therebetween, the display may also have a second set of ribs extending substantially orthogonally to and extending across at least some of the first set of ribs to form individual chambers between the ribs.

What is claimed is:

1. In a method of forming a display, the steps of:

forming a plurality of layers of green tape with each tape being particles of a glass dispersed in a binder;

forming spaced, parallel channels in the surface of one of the layers of green tape with upstanding ribs being between the channels;

stacking the layers of green tape with the layer having the channels and ribs therein being at the top of the stack, and firing the stack of green tapes at a temperature at which the glass particles fuse together to form a glass body having the channels in a surface thereof.

2. The method of claim 1 in which the channels are embossed in the surface of the layer of green tape.

3. The method of claim 2 in which the channels are embossed in the green tape by pressing against the surface of the green tape a die have the inverse of the channels in a surface thereof.

4. The method of claim 2 in which the channels are embossed in the green tape by passing the green tape under a roller having the inverse of the channels in the surface thereof.

5. The method of claim 1 in which the channels are formed by cutting elongated openings through the layer of green tape.

6. The method of claim 1 in which the green tape is formed by spreading the material of the green tape over a surface having the inverse of the channels therein so that when the green tape is stripped from the surface the channels and ribs are formed therein.

7. The method of claim 1 further comprising forming on the glass body strips of a conductive material with each strip extending along the bottom of a separate one of the channels.

8. The method of claim 7 in which prior to firing the stack of layers of green tape, the conductive strips are coated on one of the layers of green tape so that after the stack of the layers of green tape are fired, the conductive strips are embedded in the glass body.

9. The method of claim 8 in which prior to forming the stack of the layers of green tape, the stack is placed on the surface of a substrate with a suitable binder so that during the firing of the stack, the resulting glass body is bonded to the substrate.

10. The method of claim 9 further comprising placing a transparent front panel over the glass body with the front panel being seated on the ribs and bonding the front panel to the body.

11. The method of claim 10 further comprising forming spaced, parallel conductive electrodes between the front panel and the glass body with the electrodes extending substantially orthogonally to the conductive strips on the glass body.

12. The method of claim 11 in which the electrodes are coated on a surface of the front panel.

13. The method of claim 11 in which a plurality of spaced, parallel wires are stretched across and strung between two sides of a frame, the frame is placed over the glass body so that the wires extend across the channels and the front panel is mounted on the wires and secured to the body.

14. The method of claim 13 in which the wires are coated with an insulating material.

15. A method of forming a plasma display comprising the steps of:

forming a body having spaced, parallel first electrodes extending thereacross;

stringing a plurality of spaced, parallel wires between two sides of a rectangular frame with the wires being secure to the sides of the frame;

placing the frame over the body with the wires extending substantially orthogonally to the first electrodes;

placing a front panel of a transparent material over the body and the wires; and bonding the front panel to the body with the wires being secured between the front panel and the body.

16. The method of claim 15 in which after the front panel is secured to the body, the ends of the wires are cut and the frame is removed.

* * * * *